US006240827B1

(12) United States Patent
Koike et al.

(10) Patent No.: US 6,240,827 B1
(45) Date of Patent: Jun. 5, 2001

(54) COMPOSITE PISTON FOR RECIPROCATING MACHINE

(75) Inventors: Toshikatsu Koike; Kazuo Miyazawa, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/058,531

(22) Filed: Apr. 10, 1998

(30) Foreign Application Priority Data

Apr. 10, 1997 (JP) .................................................. 9-108170

(51) Int. Cl.[7] ........................................................ F16J 1/04
(52) U.S. Cl. ................................................ 92/213; 92/224
(58) Field of Search .............................. 92/222, 224, 213

(56) References Cited

U.S. PATENT DOCUMENTS

| | | | |
|---|---|---|---|
| 1,508,861 | 9/1924 | Taub | 92/224 |
| 2,707,136 | 4/1955 | Fahlman . | |
| 2,713,526 | 7/1955 | Zollner | 92/222 |
| 2,771,327 | 11/1956 | Reinberger | 92/225 |
| 2,956,846 | 10/1960 | McCullough | 92/222 |
| 4,068,645 | 1/1978 | Jenkinson | 92/169.1 |
| 4,077,810 | 3/1978 | Ohuchi et al. | 148/32 |
| 4,334,507 | 6/1982 | Kohnert et al. | 92/224 |
| 4,434,014 | 2/1984 | Smith . | |
| 5,303,764 | 4/1994 | Sasaki et al. | 148/432 |
| 5,409,661 | 4/1995 | Imahashi et al. | 419/10 |
| 5,992,015 | 11/1999 | Kurita et al. | 29/888.04 |

FOREIGN PATENT DOCUMENTS

| | | | |
|---|---|---|---|
| 449 719 | 1/1971 | (CH) . | |
| 695708 | 8/1940 | (DE) | 92/22 |
| 3719121 A1 | 12/1988 | (DE) . | |
| 3822031 A1 | 1/1990 | (DE) . | |
| 0153 473 A2 | 12/1984 | (EP) . | |
| 1226350 | 7/1960 | (FR) . | |
| 63-126661 | 5/1988 | (JP) . | |
| 63-132743 | 6/1988 | (JP) . | |
| 1-180927 | 7/1989 | (JP) . | |
| 2-233858 | 9/1990 | (JP) . | |
| 9-76042 | 3/1997 | (JP) . | |

*Primary Examiner*—F. Daniel Lopez
(74) *Attorney, Agent, or Firm*—Knobbe, Martens, Olson & Bear LLP

(57) ABSTRACT

A composite piston and method for forming such a piston for a reciprocating machine such as an internal combustion engine. A blank is formed from a pair of dissimilar alloys, one of which has substantially greater properties such as strength or abrasion resistance. The blank is forged into a piston in such a way that the two materials are bonded together in the forging process. The higher strength and/or abrasion resistance material forms at least a part of the outer surface of the piston in areas where the better properties are required. The other material backs up the higher strength or hardness material in necessary areas so as to provide an integral structure that has lightweight, low costs and nevertheless the desired properties. Various physical constructions and forming operations are disclosed.

16 Claims, 11 Drawing Sheets

COMPOSITE PISTON FOR RECIPROCATING MACHINE

BACKGROUND OF THE INVENTION

This invention relates to a piston for a machine such as an internal combustion engine and to a method for manufacturing such a piston.

The piston in a reciprocating machine is obviously a very critical part of the mechanism. This is particularly true with internal combustion engines in as much as the piston is the part of the engine that receives the explosive force from the combustion and transmits it through the connecting rod to a crankshaft for providing an output force. The various parts of the piston have specific functions in order to achieve this result.

The head of the piston must be able to withstand the compressive force and temperature of combustion. Also the area adjacent the upper surface of the head forms a ring groove area where the piston rings are supported. These provide a sealing function with the cylinder bore so as to confine the combustion products.

The piston is also provided with pin bosses that receive the piston pin and which transmit the force from the piston to the connecting rod through the piston pin. Obviously, there are high forced transmissions in this area. Furthermore there are considerable frictional forces and loads between the piston and piston pin.

In addition, the piston as a skirt portion that rubs against the cylinder bore and which assists in maintaining the piston in an upright condition within the cylinder bore. In addition, the side thrusts on the piston are taken by the skirt and thus it is also subjected to forces and must have high abrasion resistance due to its rubbing action with the cylinder bore.

Thus, it should be apparent that the different parts of the piston have different functions that require optimally different materials. Of course, it is possible to form the entire piston from the same material but this can give rise to high costs and also high weights. It is important to reduce the weight of the piston so as to reduce the inertial loading on the engine and provide high power outputs and high engine crankshafts speeds. Also, the lighter the weight the lighter the balancing masses in the engine can be in order to reduce vibrations.

Some of these functions can be achieved by changing the dimensions of the piston either alone or in combustion with changing the materials. For example, the sealing function can be improved if the piston ring area is made greater and a greater number or greater size of piston rings are employed. However, this causes emission problems in that the area around the piston rings may retain combustion products and can cause some emission concerns.

Thus, there has been proposed the formation of pistons with different materials, each serving its intended purpose for the particular part of the piston in which it is positioned. However, this is quite a difficulty in adhering or connecting these different materials to each other to provide a unitary structure. Some more methods of connections can be employ brazing or welding. However, when applied with these additional heats in order to connect the materials together, then deterioration in the properties of the associated and affected materials can result thus defeating the main purpose of the composite construction.

It has also been proposed to improve the strength of the piston in certain areas by casting in inserts in the areas where stresses is highest. For example, it has been proposed to cast in inserts in the area of the piston pin bosses so as to increase their strength without adding significantly to the overall weight of the piston. However, this also has some of the same problems aforenoted in connection with using dissimilar materials. Furthermore, the casting process becomes somewhat complicated and thus this method does not totally solve the problem.

Forging is another technique by which composite materials may be used. Some methods have been proposed, but they have not been totally successful in achieving the desired bonding strength. Therefore we have proposed a method and construction that employs a combination of powdered metal technology and forging bonding that can produce excellent results. This is disclosed in the co-pending application of certain of the applicants hereof entitled "Piston For Internal Combustion Engine And Process Of Making Same", Ser. No. 08/859,536, Filed May 20, 1997 and assigned to the assignee hereof.

The materials utilized also are important not only to achieve the desired properties, but also the proper bond. Basically, pistons for engines are generally formed from aluminum or aluminum alloy materials. The aluminum has the advantage of light weight and relatively high strength. However, the use of alloy materials has been resorted to so as to improve certain characteristics.

For example, silicon (Si) in an alloy with the aluminum to increase abrasion resistance and resistance to hardening under temperature. Copper (Cu) and Magnesium (Mg) have also been employed for increasing strength. At times, however, these alloying elements can present some problems in that their inclusion in a casting process can cause difference in particle sizes to result which can offset some of the benefits of the alloying.

It has also proposed, therefore, a method of forming a piston material by a form of sintering process which then permits the forging of a piston to obtain the desired characteristics. Such an arrangement is disclosed in the co-pending application of certain of the inventors hereof entitled "Piston For Internal Combustion Engine And Material Therefore", Ser. No. 09/022,647, filed Feb. 12, 1998, and also assigned to the assignee hereof.

In accordance with the features hereof these materials are combined with lower costs materials to form a composite piston that will provide the performance desired along with lightweight and lower costs.

It is, therefore, a principal object to this invention to provide an improved piston construction for an internal combustion engine.

It is a further object to this invention to provide an improved, lightweight, high strength and high abrasion resistant, composite piston for a reciprocating machine.

It is a further object to this invention to provide an improved low cost piston having the desired material requirements in the various areas of the piston.

It is a further object to this invention to provide an improved method for manufacturing a composite piston of the aforenoted type.

SUMMARY OF THE INVENTION

This invention is adapted to be embodied in a composite piston for a reciprocating machine comprised of a pair of dissimilar materials bonded together by a forging process. A first of the materials has a property having characteristics selected from the group of strength and abrasion resistance that is substantially greater than the other. The piston is comprised of a head portion having an upper surface adapted to experience pressure and a peripheral ring groove portion for receiving at least one sealing ring below the upper surface. A skirt portion comprised of at least a pair of surfaces for sliding engagement with a cylinder bore formed below said head portion. A pair of piston pin bosses having piston pin receiving openings for connection to a connecting rod small end by a piston pin is disposed below the ring groove. The piston pin bosses are formed between circumferentially spaced portions of the skirt portion surfaces. The one material forms at least a portion of the piston pin bosses in the area where engaged by the piston pin.

DETAILED DESCRIPTION OF THE PREFERRED EMBODIMENTS OF THE INVENTION

Figure 1:
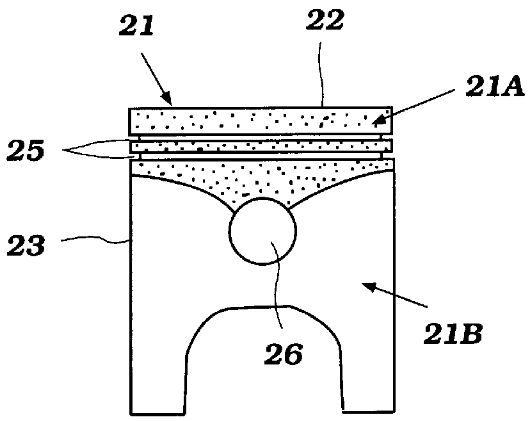
FIG. 1 is a side elevational view of a composite piston constructed in accordance with a first embodiment of the invention.

Referring now to the first embodiment and that shown in FIGS. 1–9, and initially primarily to FIGS. 1–5, a piston 21 constructed in accordance with this embodiment is illustrated. The piston 21 has a configuration which in external appearance is similar to most conventional pistons. This includes a head portion 22 from which a skirt portion 23 depends. The interior of the piston 21 in the area of the piston skirt 23 is formed with larger thickness material portions that form piston pin bosses 24.

The area above the piston pin bosses 24 forms a head portion in which piston ring grooves 25 are received. A piston pin 26 is received in bored openings in the piston pin bosses 24 to provide the connection to the associated connecting rod which is not shown.

In accordance with this embodiment of the invention, the body of the piston 21 is formed from two materials comprised of a first material indicated at 21A which is of a higher strength and higher abrasion resistance and which is alloyed in a manner to be described and which is formed also in a manner to be described.

Because of the alloying of the material 21A, it has a higher cost and higher weight than the remaining base piston material, indicated at 21B. The base piston material 21B may be also formed from a known lightweight and low cost material. In fact, lower cost materials may be employed then with conventional pistons because the material 21A takes the higher loading, in a manner which will be described.

Figure 2:
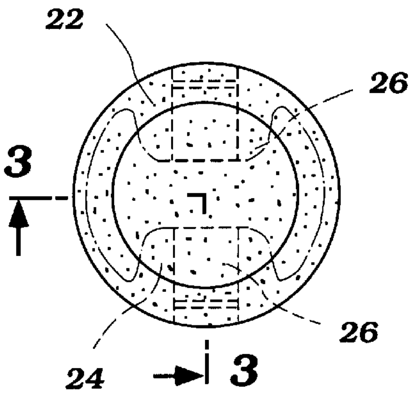
FIG. 2 is a top plan view of the piston of this embodiment.
Figure 3:
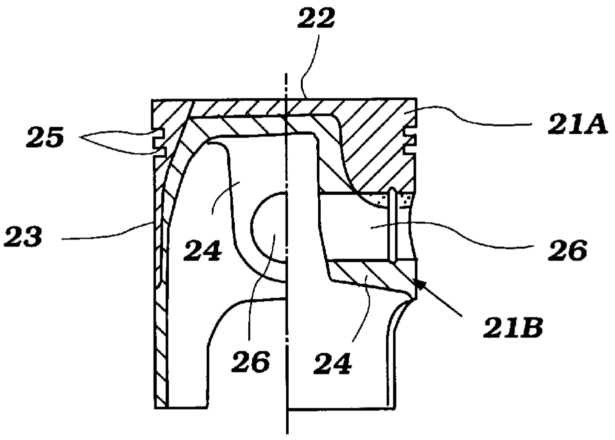
FIG. 3 is a cross sectional view taken along the line 3—3 of FIG. 2.

As may be seen primarily from FIGS. 1 through 3, the head area 22 including its entire, exposed upper surface and the exposed or exterior ring area 25 are formed so that the material 21A forms the exposed outer surface of the piston 21. In addition the upper or piston head sides of the boss portions 24 that contact the outer ends of the piston pin 26 are also formed by the material 21A. skirt in the area between the piston pin bosses 24 then in the area of the piston pin bosses.

This is to provide the requisite strength and heat resistance in the piston pin groove area 25 and also to carry on this material so that it is in the upper area of the piston pin bosses where the piston pins 26 are received. This provides wear resistance and strength to take the major part of the loading when the piston 21 is being driven downwardly from the expansion of the gases.

The material by which the piston portion 21A is formed is made as set forth in the aforenoted co-pending application, Ser. No. 09/022,647. However, that method will be described again in detail here.

First, a powered metal is formed having the desired chemical constituents and alloying to be employed in the finished surface portion of the piston. This is done by first forming an ingot from which the powered metal is to be formed which will be compressed then into a sintered state to form the blank from which the piston portion is forged.

The ingot is formed from an alloy of aluminum and certain alloying materials which are added to improve strength, abrasion resistance and resistance to deterioration under heat. Basically, this ingot is formed from an aluminum alloy that consists of aluminum (Al) as a base material and certain alloying materials such as silicon (Si), iron (Fe), and other materials as will be noted. As will become apparent as this description proceeds, the ingot is subsequently converted into a metal powder state which is subsequently heated and extruded to form blanks from which the piston portion 21A is forged.

Certain of these alloying materials may not be included directly in the ingot but may be formed as separate powders which are then mixed with the ingot powder during the extrusion and heating step that forms the formed metal blanks for forging. As will be described below, silicon carbide (SiC) is one of such materials that may be separately mixed with the powder formed from the ingot.

EXAMPLE 1

A first example of the material from which the ingot may be formed includes as alloying materials to the base aluminum (Al) the following alloying elements:

| | |
|---|---|
| silicon (Si) | 10–22% by weight |
| iron (Fe) | 1–10% by weight |
| copper (Cu) | 0.5–5% by weight |
| magnesium (Mg) | 0.5–5% by weight |
| manganese (Mn) | 1% or less by weight |
| nickel (Ni) | 1% or less by weight |
| chromium (Cr) | 1% or less by weight |
| zirconium (Zr) | 2% or less by weight |
| molybdenum (Mo) | 1% or less by weight |

The silicon alloying material improves abrasion resistance and resistance to cracking or breaking and is in the form of hard primary crystals or eutectic crystals in the metal texture. Iron is added to obtain high strength at temperatures of 200° C. or more and by disbursing and strengthening the metal texture. Copper and magnesium are added to improve the strength at temperatures less than 200° C. It has been found that amounts greater than outside the ranges specified may fail to obtain the desired abrasion resistance and strength at the varying temperatures.

EXAMPLE 2

A specific example of alloying material that falls within the range of Example 1 and which is preferred is as follows:

| | |
|---|---|
| silicon (Si) | 17% |
| iron (Fe) | 5% by weight |
| copper (Cu) | 1% by weight |
| magnesium (Mg) | 5% by weight |
| manganese (Mn) | 0.01% by weight |
| nickel (Ni) | 0.01% by weight |
| chromium (Cr) | 0.01% by weight |
| zirconium (Zr) | 1% by weight |
| molybdenum (Mo) | 0.01% by weight |

EXAMPLE 3

Another range of embodiment of alloy that can be employed in connection with the invention employs Silicon carbide (SiC) as an alloying material and has the following alloying elements:

| | |
|---|---|
| silicon (Si) | 10–22% by weight |
| iron (Fe) | 1–10% by weight |
| copper (Cu) | 0.5–5% by weight |
| magnesium (Mg) | 0.5–5% by weight |
| manganese (Mn) | 1% or less by weight |
| nickel (Ni) | 1% or less by weight |
| chromium (Cr) | 1% or less by weight |
| zirconium (Zr) | 2% or less by weight |
| molybdenum (Mo) | 1% or less by weight |
| silicon carbide (SiC) | 1–10% by weight |

EXAMPLE 4

A specific preferred embodiment employing silicon carbide as an alloying agent and falling within the range of Example 3 includes the following components:

| | |
|---|---|
| silicon (Si) | 17% by weight |
| iron (Fe) | 5% by weight |
| copper (Cu) | 1% by weight |
| magnesium (Mg) | 0.5% by weight |
| manganese (Mn) | 0.01% by weight |
| nickel (Ni) | 0.01% by weight |
| chromium (Cr) | 0.01% by weight |
| zirconium (Zr) | 1% by weight |
| molybdenum (Mo) | 0.01% by weight |
| silicon carbide (SiC) | 5% by weight |

In addition to silicon carbide, other materials such as aluminum oxide ($Al_2O_3$) or aluminum nitride (AlN) may be substituted to improve abrasion resistance in the amounts specified in Examples 3 and 4, i.e. 1–10% or specifically 5%.

It has been found that the crystalline size of certain of the alloying materials is important in obtaining the desired abrasion resistance, resistance to cracking and high fatigue strength. For example, the initial crystalline silicon particle diameter should be not greater than 10 $\mu$m. Also, the average particle diameter of the iron should be not greater than 10 $\mu$m. Where as has been previously noted, these alloying materials may be either incorporated in the ingot from which the powder is formed or may be formed from separate particles that arc molded into the pellet through mixing with the particles formed from the primary aluminum alloy. Either method can be employed so long as the resulting crystalline particle size is within the range set forth.

In the examples given as Example 3 and Example 4 it is particularly advantageous to add the silicon carbide (SiC) as a separate powder mixed with the powder from the ingot before solidifying. If this is done the particle size of the silicon carbide (SiC) powder before mixing should preferably be 5 $\mu$m.

The particles are formed by melting the ingot from the alloy and the base materials at a temperature of 700° C. or more. This molten material is then sprayed like a fog and rapidly cooled to solidify at a cooling rate of at least 100° C. per second thereby obtaining a rapidly solidified powder metal of the aluminum alloy. It has been found that good results can be obtained when the specific particle size of the wear-resistant material such as the silicon carbide has a diameter of 5 $\mu$m. As has been noted, this is particularly useful when the particles are formed separately and combined in the next step which will be described.

After the power has been formed in the manner aforedescribed, then it is sintered into a blank from which the final forged piston 21 will be formed. The part 21A is formed as a cylindrical blank as shown in FIG. 4 by a process utilizing an apparatus as illustrated in FIG. 5.

Figure 4:
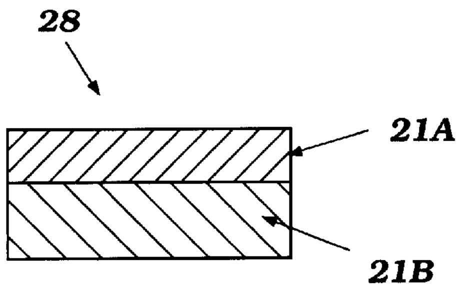
FIG. 4 is a cross sectional view showing a forging blank that is utilized in connection with the formation of the piston of this embodiment.
Figure 5:
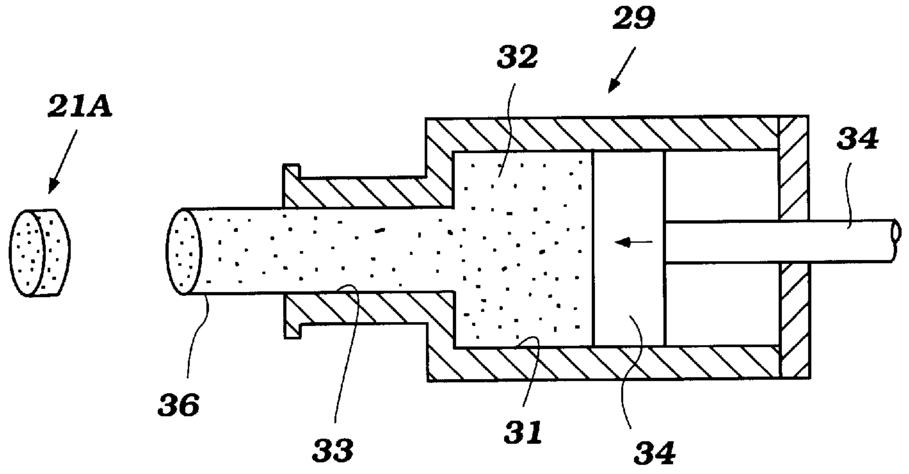
FIG. 5 is a partially exploded, in part, perspective view showing how one of the blanks for the forging process is formed.

This cylindrical blank, also indicated by the reference numeral 21A, is placed into engagement with another blank, also indicated by the reference numeral 21B, which also be formed by a powered sintering process or by casting or any other process so as to result in a forging blank having a configuration as shown in FIG. 4 and which is identified in this figure by the reference numeral 28.

A specific example of the material 21B may be an aluminum alloy conventionally used for casting as a melt production-type (continuous casting material) such as an aluminum alloy of a melt production-type containing aluminum (Al) as a base material. This may be alloyed with 10–22% by weight of silicon (Si), 1% by weight or less of iron (Fe), 0.5–5% by weight of copper (Cu), 0.5–2% by weight of magnesium (Mg), 1% by weight or less of manganese (Mn), 1% by weight or less of nickel (Ni) and 1% by weight or less of chromium (Cr).

One specific example of such a material is an aluminum alloy of the melt production-type containing 19% by weight of silicon (Si), 0.2% by weight of iron (Fe), 4% by weight of copper (Cu), 1% by weight of magnesium (Mg), 0.1% by weight of manganese (Mn), 0.1% by weight of nickel (Ni) and 0.1% by weight of chromium (Cr).

The sintered blank 21A is then formed by an extruding process utilizing an apparatus as shown in FIG. 5. Basically, the powder is heated and extruded under pressure at a temperature of less than 700° C. and preferably in the range of 400 to 500° C. into a hollow cylinder. The apparatus by which this is done is illustrated, as has been noted in FIG. 5, and will now be described by particular reference to that figure.

The apparatus is indicated generally by the reference numeral 29 and includes an extruding cylinder having a bore 31 in which the powder, indicated at 32 is charged. A smaller diameter extruding passage 33 is formed at one end of the bore 31.

An annular piston 34 is mounted within the bore 31 and has an extending portion 35 that is engaged by a ram for extruding the powder through the portion 33 in which it solidifies and results in the formation of a hollow cylindrical extrusion 36. This extrusion is then cut off at the desired lengths to provide the blank portions 21A.

These portions are then placed into engagement with the blank 21B so as to provide the configuration as shown in FIG. 4 which forms the final forging blank.

Figure 6:
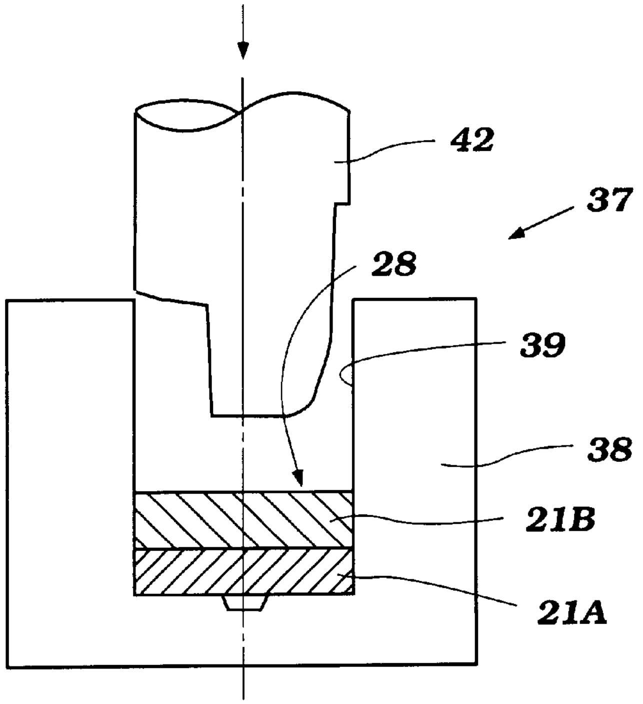
FIG. 6 is a view showing the blank of FIG. 4 in the forging apparatus before the forging has commenced.
Figure 7:
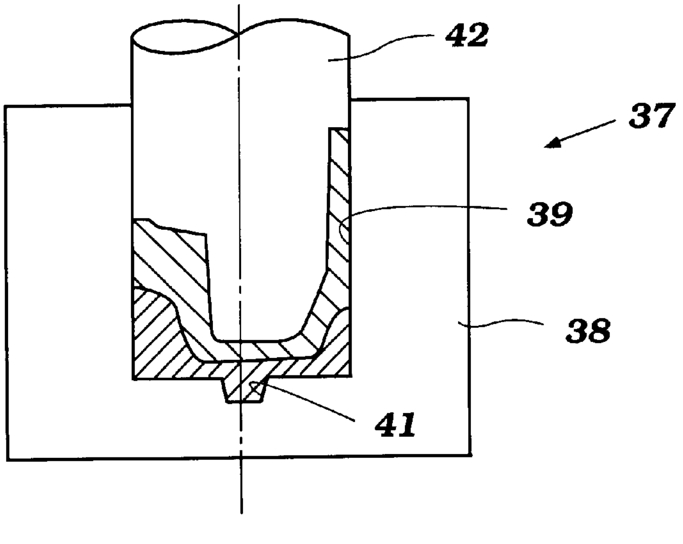
FIG. 7 is a cross sectional view, in part similar to FIG. 6, and shows the completion of the forging operation.

After the blank 28 is formed, it is then placed in the forging apparatus shown in FIGS. 6 and 7 and which forging apparatus is indicated generally by the reference numeral 37. This forging apparatus 37 includes a female die 38 having a cylindrical opening 39 closed by an end wall having a recess 41.

It should be noted that the sections of FIGS. 6 and 7 are taken along the same plane as FIG. 3 so that the piston shape can be compared although the sides are reversed in this figure.

The blank 28 may be coated with a release material and also may be heated to bring it up to a temperature less than 700° C. and preferably in the range of 400 to 500° C. A ram 42 is then pressed into the forging die 38 to the position shown in FIG. 7 wherein the final formation of the piston is formed. Preferably, the die 38 and forging press 42 are also brought up to a temperature less than 700° C. and then in the range of 400 to 500° C. If this is done, the blank 28 need not be heated but can be left in the dies for a time period until it reaches this temperature.

After the forging has been completed, then finished machining, heat treating and other machining steps can be formed. This can include the cutting of the ring grooves, final honing of the piston pin holes and any other finish machining and surface treatment as may be desired.

During the forging process, any surface oxides of the material of either of the blank materials 21A or 21B will be destroyed by the friction of the forging process thus improving the bond between the materials. This further increases the strength of the resulting piston.

The surface properties of the resulting piston and particularly the specific areas of the piston comprised of the materials 21A and 21B will now be described by references to FIGS. 8 and 9. In these figures, the characteristics of Examples 2 and 4 above are compared as materials A2 and A4 with an example of a conventional piston material identified at B. Basically, the difference between Materials 2 and 4 is that Material 2 has no silicone carbide while Material 4 is alloyed with silicone carbide. Except for this difference, the constituents of the two alloys are the same.

Figure 8:
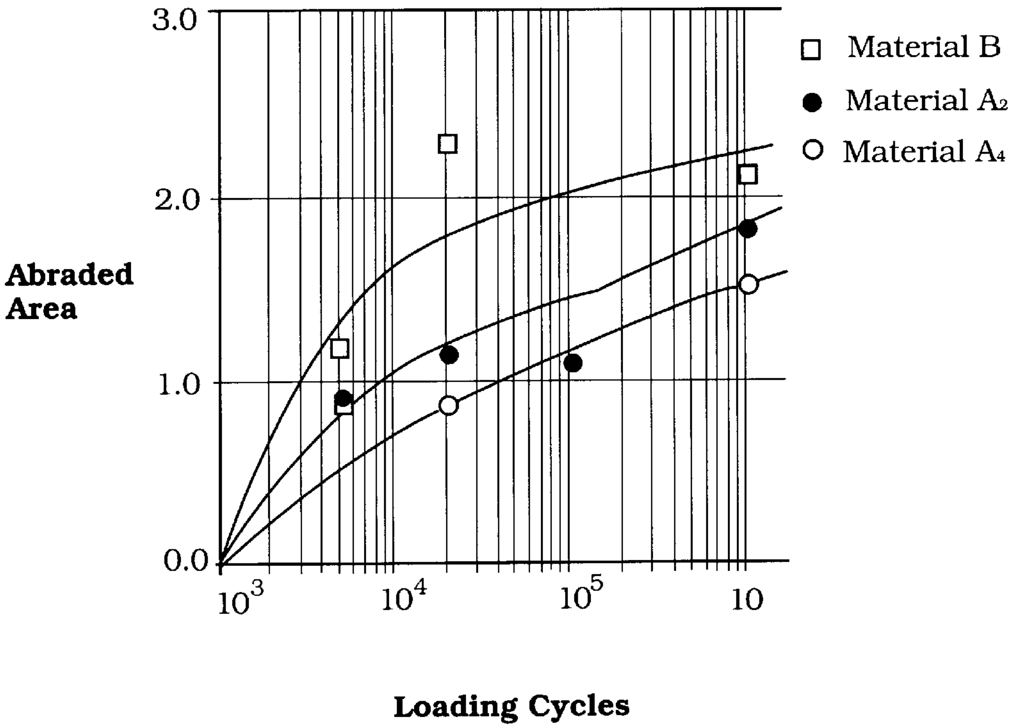
FIG. 8 is a graphical view showing the abrasion resistance for different materials.

FIG. 8 shows the results of a conventional fretting type abrasion test. This is done by repeatedly scuffing the material. This is done at a temperature of 250° C. The greater the area of abrasion marks, the less the abrasion resistance. It will be seen that the two alloy materials in accordance with the invention, i.e. Materials A2 and A4, have much greater abrasion resistance then the conventional piston material B. As a result, the areas that are subject to abrasion are formed with this surface and the remaining area of the piston can be made from the lighter weight, less expensive material.

Figure 9:
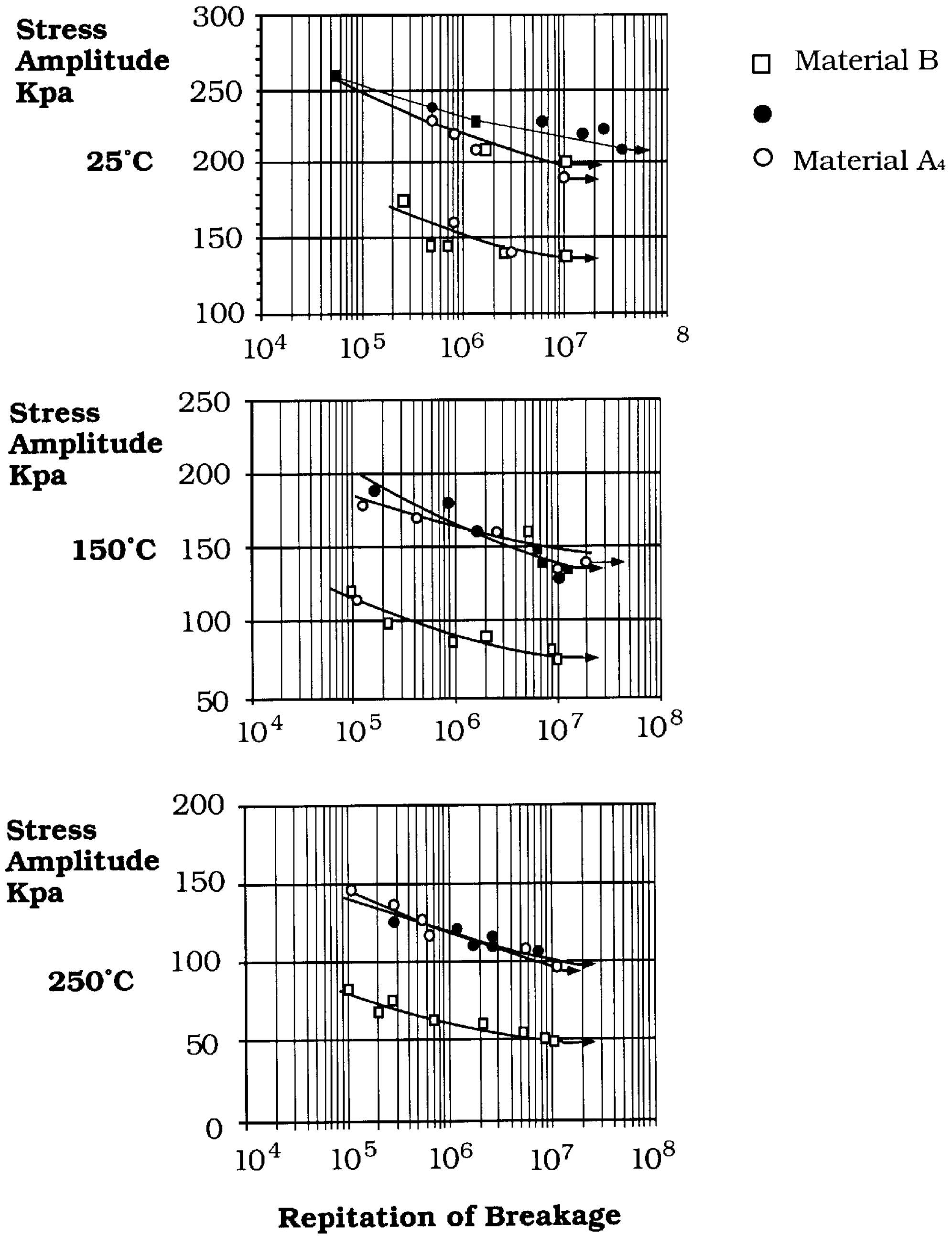
FIG. 9 is a graphical view showing the fatigue strength of certain materials at varying operating temperatures.

FIG. 9 shows the fatigues strengths of the same respective materials at various temperatures. It will be seen that the fatigue strength at various temperatures is much greater for the materials in accordance with the invention then the conventional material which is used for the base of the piston. Hence, by utilizing this method it is possible to improve the piston performance while not increasing significantly its weight or cost.

FIGS. 10–16 show another embodiment which differs from the previous embodiment in two regards. The first is the relative area of the piston 21 which is formed from the two materials 21A and 21B and the second, is how the blank is formed from which the piston is formed.

Figure 10:
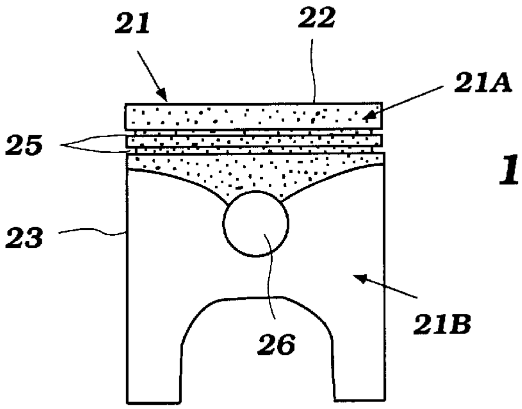
FIG. 10 is a side elevational view, in part similar to FIG. 1, and shows another embodiment of composite piston.
Figure 11:
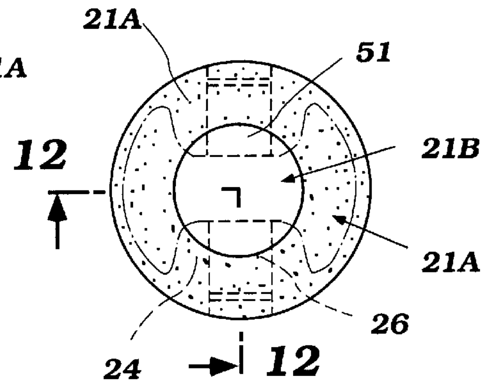
FIG. 11 is a top plan view of the piston of this embodiment.
Figure 12:
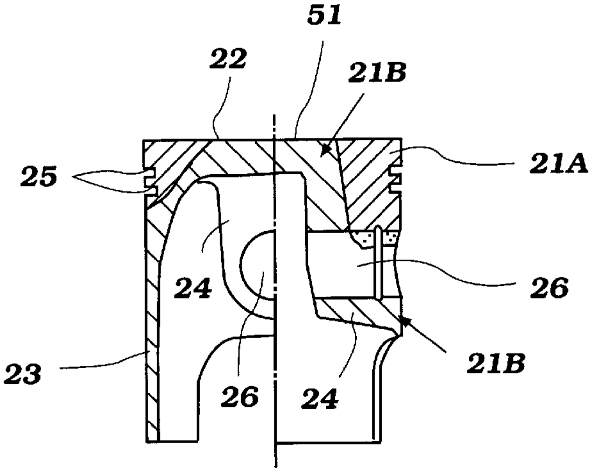
FIG. 12 is a cross sectional view taken along the line 12—12 of FIG. 11.

Referring first to FIGS. 10–12, it should be noted that the general shape of the piston is substantially the same as the previously described embodiment and hence the same reference characters have been applied. However, with this embodiment further lightening and the weight without sacrifice of strength is made possible by leaving the area at the center of the upper surface of the head portion 22 uncovered by the material 21A. This open area is indicated at 51.

This elimination of a portion of the material 21A reduces the cost and weight without a significant loss of strength of the piston 21. In fact the exposure of a portion of the material 21B on the piston head 22 may result in lower piston temperatures because of the possible higher heat transfer.

Figure 13:
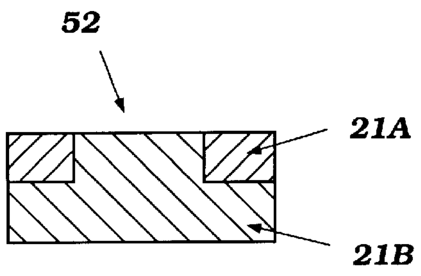
FIG. 13 is a cross sectional view showing the forging blank employed for manufacturing the piston shown in FIGS. 10–12.

This embodiment is also formed using a blank which differs from the previous blanks and which is shown in FIG. 13 and identified by the reference numeral 52. Specifically the blank portion 21A has an open hollow cylindrical shape so as to expose the material 21B in the noted head area 51.

Figure 14:
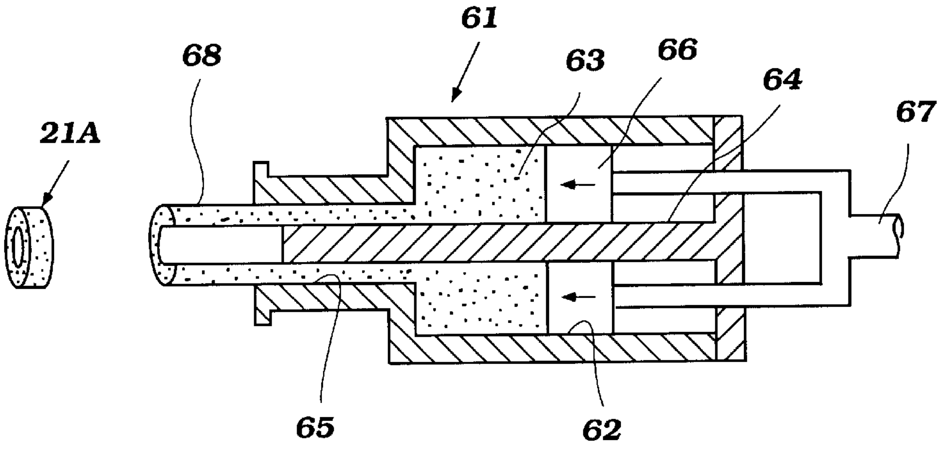
FIG. 14 is a partially exploded, partially perspective view showing the apparatus for forming the blank shown in FIG. 13.
Figure 15:
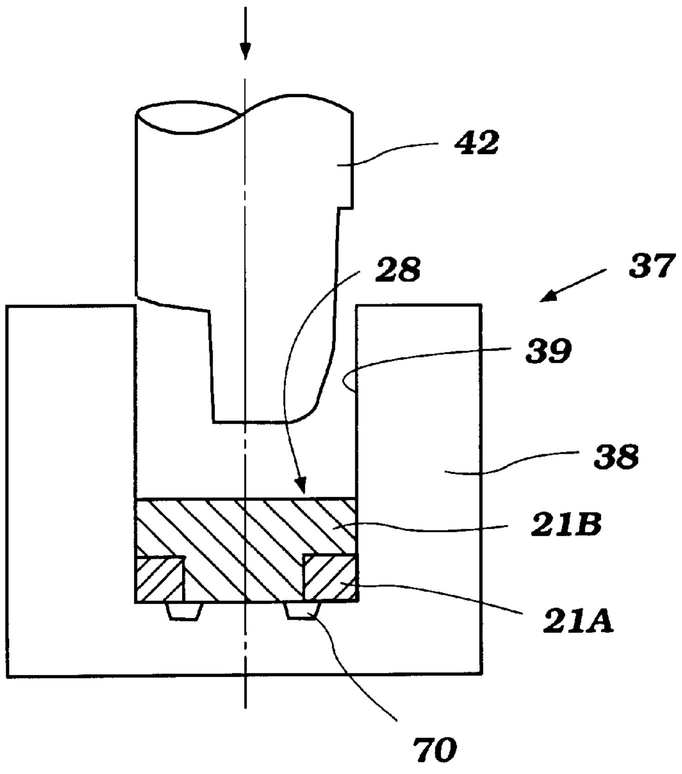
FIG. 15 is a cross sectional view of a forging apparatus showing the blank when initially inserted and before the forging has begun.

The blank 52 is formed by the apparatus shown in FIG. 14. Like the previous example, the sintered blank formed by an extruding process utilizing an apparatus as shown in FIG. 14. Basically, the powder is heated and extruded under pressure at a temperature of less than 700° C. and preferably in the range of 400 to 500° C. into a cylinder. The apparatus by which this is done is illustrated, as has been noted in FIG. 14, and will now be described by particular reference to that figure.

The apparatus is indicated generally by the reference numeral 61 and includes an extruding cylinder having a bore 62 in which the powder, indicated at 63 is charged. A fixed core rod 64 extends through the end of the cylinder 62 and through a smaller diameter extruding passage 65.

An annular piston 66 is mounted within the bore 62 and has an extending portion 67 that is engaged by a ram for extruding the powder through the portion 65 in which it solidifies and results in the formation of a hollow cylindrical extrusion 68. This extrusion is then cut off at the desired lengths to provide the blank portions 21A.

These portions are then slipped over the smaller diameter portion of the blank 21B so as to provide the configuration as shown in FIG. 13 which forms the final forging blank. The resulting blank 52 is forged by the apparatus shown in FIGS. 15 and 16 in the manner previously described.

Figure 16:
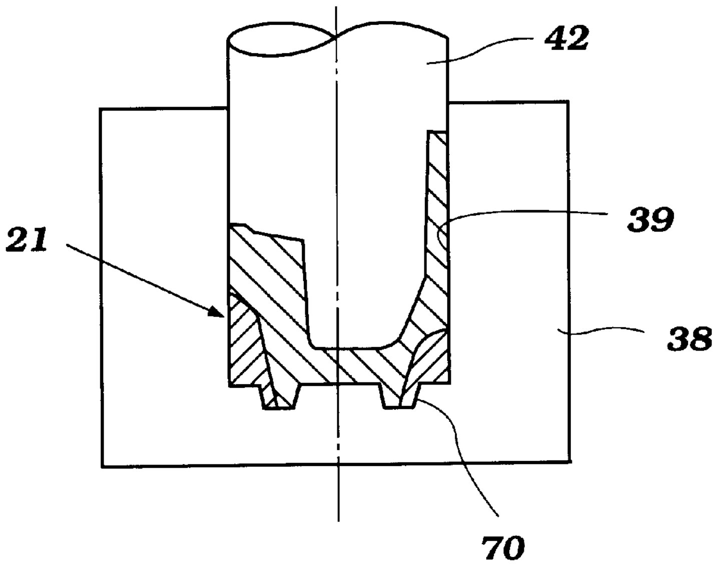
FIG. 16 is a cross sectional view, in part similar to FIG. 15, and shows the completion of the forging step for this embodiment.
Figure 17:
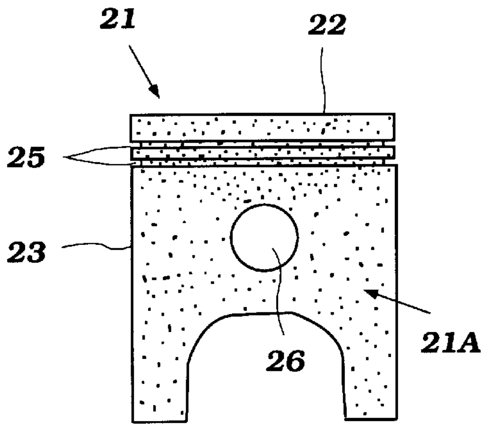
FIG. 17 is a side elevational view, in part similar to FIGS. 1 and 10, and shows still another embodiment of composite piston.

Except for the end wall that forms the piston head 22 this apparatus is the same as that shown in FIGS. 6 and 7. Thus like reference numerals have been employed to identify like parts. Rather than a central recess at the closed end of the die cylinder 39 there is formed an annular groove 70. This is at the areas where the two blank materials 21A and 21B abut. This helps to insure that there will be full metal to metal bonding in this area as seen in FIG. 16.

Figure 18:
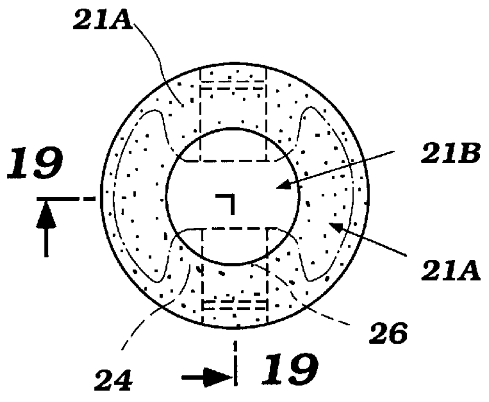
FIG. 18 is a top plan view of the piston of this embodiment.
Figure 19:
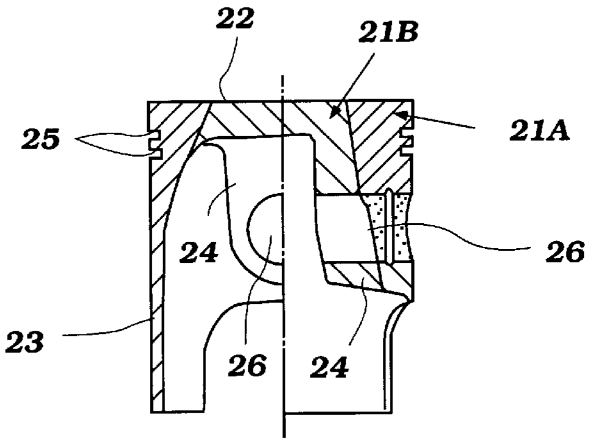
FIG. 19 is a cross sectional view taken along the line 19—19 of FIG. 18.

FIGS. 17–23 show another embodiment of the invention which is generally similar to the embodiments previously described. In this embodiment, however, the piston material 21A forms the entire outer surface of the resulting piston, indicated again at 21, except for the exposed area of the material 21*b* in the head area 51 as seen in FIGS. 18 and 19. Thus, in this embodiment, the entire exterior surface of the piston 21 is formed from the harder more abrasion resistant material except for this head void area 51. Also and as seen best in FIG. 19, the outer portions of the piston pin receiving bores of the bosses 24 arc also covered completely around their circumference by the material 21A.

Figure 20:
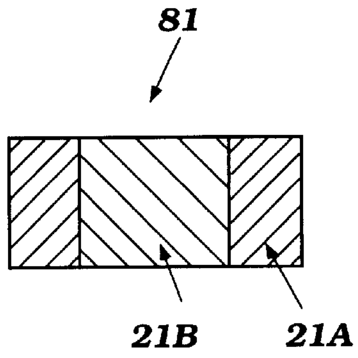
FIG. 20 is a cross sectional view showing the forging blank employed for manufacturing the piston shown in FIGS. 17–19.
Figure 21:
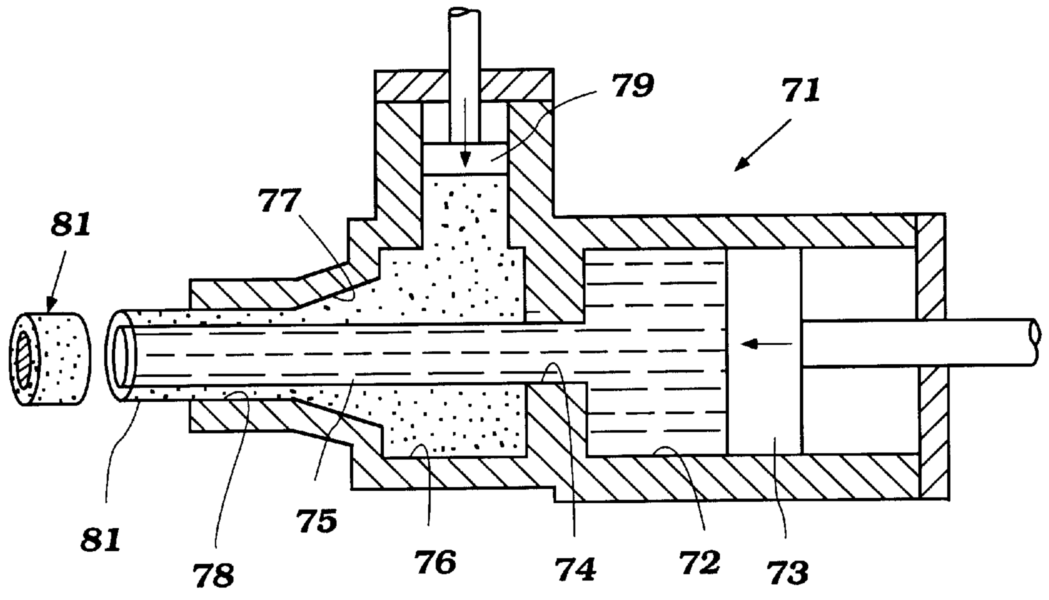
FIG. 21 is a partially exploded, partially perspective view showing the apparatus for forming the blank shown in FIG. 20.

The blank utilized for this embodiment has a different shape and is also formed in a different manner as shown in FIGS. 20 and 21. In this embodiment the portion 21B is also formed simultaneously by an extrusion process. Hence, the extruding apparatus, indicated generally by the reference numeral 71 includes a first cylindrical chamber 72 wherein a solid blank of the material for the blank portion 21B is positioned. This is heated to a temperature in the range of 400° C. to 500° C. A piston 73 acts to extrude this material through a restricted extruding opening 74. Thus, there will be a solid core 75 formed around which the piston material 21A is extruded.

Thus, the core 75 that is formed is extruded into a chamber 76. This chamber 76 has a tapering portion 77 that leads to an extruding portion 78.

One or more side pistons 79 compresses the metal particles of the material 21A in the chamber 76 and extrudes them through the opening 78 so that a composite blank 81 is formed. This blank 81 will thus not only facilitate the extrusion, but also will permit some initial bonding of the material.

Figure 22:
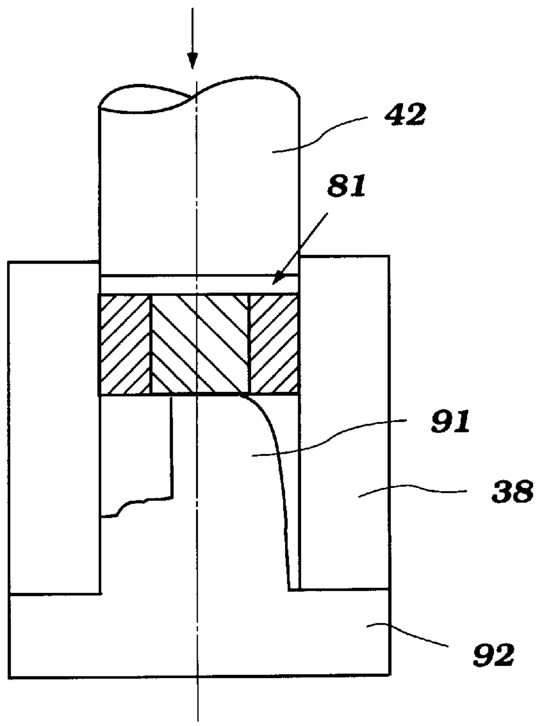
FIG. 22 is a cross sectional view of a forging apparatus showing the blank when initially inserted and before the forging has begun in this embodiment.
Figure 23:
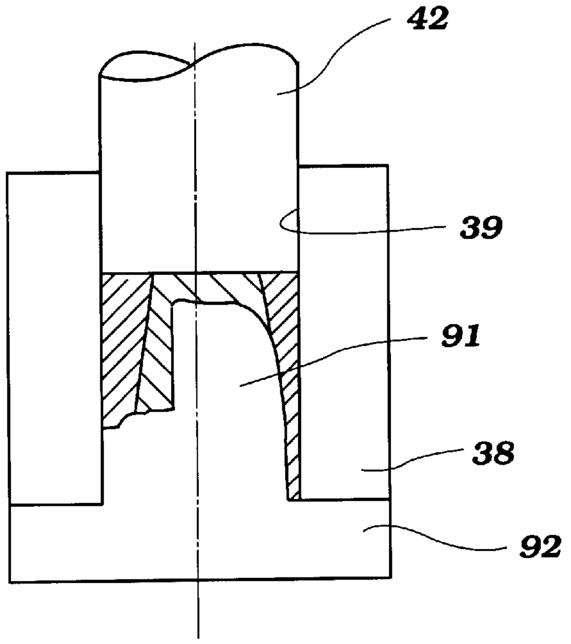
FIG. 23 is a cross sectional view, in part similar to FIG. 22, and shows the completion of the forging step for this embodiment.

The piston is then forged from this blank in the manner previously described and using the same type of apparatus as shown in FIGS. 22 and 23. The piston 21 in the previous embodiments has been forged in an inverted position in the previous embodiments. That is the pressing element 42 has formed the interior of the piston 21. That arrangement is reversed in this embodiment. That is the interior of the piston 21 is formed by an extension 91 of an end cap 92 that closes the lower end of the cavity 39 of the die 38.

Thus, from the forgoing description, it should be readily apparent that the described constructions and methodology permits the formation of lightweight pistons having the appropriate surface properties and metal characteristics without significant increase in weight and/or cost. Of course, the foregoing description is that of preferred embodiments of the invention, and various changes and modifications can be made without departing from the spirit and scope of the invention, as defined by the appended claims.

What is claimed is:

1. A composite piston for a reciprocating machine comprised of a pair of dissimilar materials affixed to each other solely through bonding by a forging process, one of said materials having a property having characteristics selected from the group of strength and abrasion resistance that is substantially greater than that of the other of said materials and comprised of aluminum alloyed with iron (Fe) having a particle diameter not greater than 10 μm, said piston being comprised of a head portion having an upper surface adapted to experience pressure and a peripheral ring groove portion for receiving at least one sealing ring below said upper surface, a skirt portion comprised of at least a pair of surfaces for sliding engagement with a cylinder bore formed below said head portion, and a pair of piston pin bosses having piston pin receiving openings for connection to a connecting rod small end by a piston pin, said piston pin bosses being formed between circumferentially spaced portions of said skirt portion surfaces, said one material forming at least a portion of the outer surface of said piston in an area extending at least in part across portions of said piston pin receiving opening that are engaged by the piston pin.

2. A composite piston for a reciprocating machine as set forth in claim 1, wherein the one material also forms substantially the entire piston ring groove portion.

3. A composite piston for a reciprocating machine as set forth in claim 1, wherein the one material also covers at least a part of the top surface of the head portion.

4. A composite piston for a reciprocating machine as set forth in claim 3, wherein the one material covers all of the top surface of the head portion.

5. A composite piston for a reciprocating machine as set forth in claim 3, wherein at least the central portion of the top surface of the head portion is formed from the other of the materials.

6. A composite piston for a reciprocating machine as set forth in claim 1, wherein the other material also forms a portion of the piston pin boss portion.

7. A composite piston for a reciprocating machine as set forth in claim 1, wherein the one material forms substantially the entire exterior side surface of the ring groove portion and the skirt portion.

8. A composite piston for a reciprocating machine as set forth in claim 7, wherein the one material also forms the entire upper surface of the head portion.

9. A composite piston for a reciprocating machine as set forth in claim 1, wherein the one material is further alloyed with silicon (Si) having a particle diameter not greater than 10 μm.

10. A composite piston for a reciprocating machine as set forth in claim 9 wherein the silicon (Si) is in an amount of 10–22% by weight of the alloy.

11. A composite piston for a reciprocating machine as set forth in claim 9 wherein the iron (Fe) is in an amount of 1–10% by weight of the alloy.

12. A composite piston for a reciprocating machine as set forth in claim 11 wherein the alloying material also comprises silicon (Si).

13. A composite piston for a reciprocating machine as set forth in claim 12 wherein the silicon (Si) is in an amount of 10–22% by weight of the alloy.

14. A composite piston for a reciprocating machine as set forth in claim 9 wherein the alloying material also comprises a material harder than silicon (Si).

15. A composite piston for a reciprocating machine as set forth in claim 14 wherein the alloying material harder than silicon (Si) is selected from the group comprised of silicon carbide (SiC), aluminum oxide ($Al_2O_3$) and aluminum nitride (AlN).

16. A composite piston for a reciprocating machine as set forth in claim 15 wherein the amount of alloying material from the group comprised of silicon carbide (SiC), aluminum oxide($Al_2O_3$) and aluminum nitride (AlN) is in the range of 1–10% by weight of the alloy.

* * * * *